United States Patent [19]

Langeraar

[11] 4,227,196
[45] Oct. 7, 1980

[54] DIRECTION FINDING APPARATUS

[75] Inventor: Huibert B. Langeraar, Hengelo, Netherlands

[73] Assignee: Hollandse Signaalapparaten B.V., Hengelo, Netherlands

[21] Appl. No.: 956,753

[22] Filed: Nov. 1, 1978

[30] Foreign Application Priority Data

Nov. 14, 1977 [NL] Netherlands .......................... 7712482

[51] Int. Cl.$^2$ ............................................. H04B 7/00
[52] U.S. Cl. ........................... 343/100 CL; 343/113 R
[58] Field of Search .................. 343/100 CL, 100 LE, 343/113 R

[56] References Cited

U.S. PATENT DOCUMENTS 3,938,154  2/1976  Lewis ............................ 343/100 CL Primary Examiner—Theodore M. Blum
Attorney, Agent, or Firm—Simon L. Cohen

[57] ABSTRACT

A radio direction finding apparatus comprising an omnidirectional receiving element (21), an array of directional receiving elements (1.1-1.2N), two log video detectors (15, 16) suited for separate connection to two contiguous elements of said array and a subtraction circuit (27) for generating a signal containing the azimuth data of an r.f. transmitter. In order to select echoes received through the main lobes of the two connected receiving elements from those received through the main lobe of the one element and a side lobe of the other element, the radio direction finding apparatus is provided with a threshold circuit (18) and two gate circuits (19, 20) separately inserted between the log video detectors (15, 16) and the subtraction circuit (27). The threshold circuit (18) passes the applied signals through the gate circuits (19, 20) if the strength of the latter signals exceeds that of the echo signal obtained from the omnidirectional receiving element (21) via a third log video detector (22).

3 Claims, 2 Drawing Figures

DIRECTION FINDING APPARATUS

The invention relates to a radio direction finding apparatus comprising an omnidirectional receiving element, an array of directional receiving elements, two log video detectors having a separate connection with two contiguous directional receiving elements of said array, and a subtraction circuit for generating a signal containing the azimuth data of an r.f. transmitter, observed through said two contiguous directional receiving elements, in response to separate feeding of output signals from the log video detectors.

Such a direction finding apparatus is widely known; in a special embodiment thereof the directional receiving elements are of the horn type and are disposed symmetrically in a circular array and in outward direction. When r.f. signals from a transmitter are detected by two contiguous directional receiving elements and the subtraction circuit is connected to these receiving elements via the two log video detectors, it is possible to measure the azimuth direction of the transmitter. The azimuth data required for such a measurement need not necessarily be relative to a transmitter situated within the azimuth sector covered by the common part of the main lobes of these receiving elements, but—through the side-lobe sensitivity of the receiving elements—may also be relative to a transmitter situated outside this azimuth sector. As a consequence, the azimuth data cannot be interpreted unambiguously, making the measurement of the direction finding apparatus unreliable; this must be considered as a disadvantage of such a direction finding apparatus. The object of the present invention is to provide a solution to which overcomes this disadvantage.

In accordance with the invention, the radio direction finding apparatus as set forth in the opening paragraph comprises a gate circuit inserted between each log video detector and the subtraction circuit, and further comprises a threshold circuit connected to the log video detectors and, through a third log video detector, to the omnidirectional receiving element. The threshold circuit produces a control signal for each gate circuit, but only when the intensity of the output signals from each of the two log video detectors exceeds that of the output signal from the third log video detector, in order to apply the output signals of the log video detectors connected to the receiving elements to the subtraction circuit via the associated gate circuit.

The invention will now be explained with reference to the accompanying drawings, in which.

Figure 1:
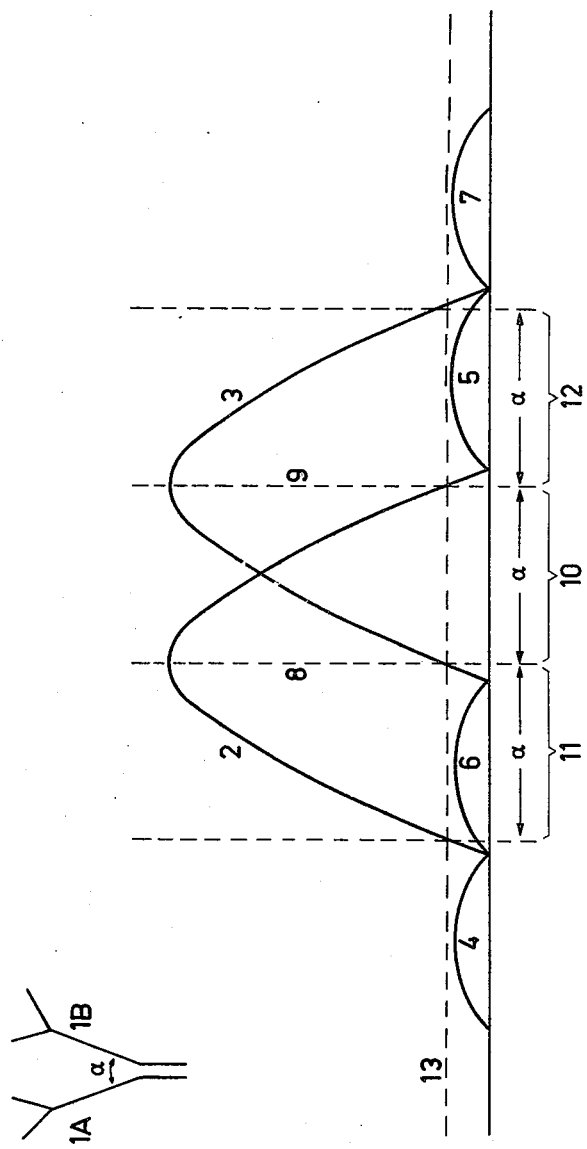
FIG. 1 is a diagram of the receiving patterns of two contiguous directional receiving elements.

In the diagram of FIG. 1 the receiving antenna patterns are shown as a function of the direction finding apparatus for two directional receiving elements 1A and 1B, where the respective main lobes 2 and 3 partly overlap each other. In addition to the main lobe 2, the antenna pattern of receiving element 1A comprises a first left-hand and right-hand side lobe 4 and 5 respectively, while the pattern of receiving element 1B contains, in addition to main lobe 3, a first left-hand and right-hand side lobe 6 and 7 respectively. The remaining side lobes are of minor importance here and are therefore not shown in the diagram. The two receiving elements 1A and 1B are inclined at an angle $\alpha$ to each other, such that the main axis of the receiving pattern of one receiving element is just within the main lobe of the other.

Axes 8 and 9 of main lobes 2 and 3 define an azimuth sector 10 which represents the direction-finding field of the receiving elements 1A and 1B. The portions of main lobes 2 and 3 outside of sector 10 are in turn situated in the two adjacent sectors 11 and 12 respectively. Hence, an r.f. signal from a transmitter situated in sector 10 will be picked up by receiving element 1A via main lobe 2 and by receiving element 1B via main lobe 3 morover, a transmitter situated in sector 11 or 12 will also be detected by receiving elements 1A and 1B: a transmitter in sector 11 will be detected by element 1A via main lobe 2 and by element 1B via side lobe 6, while a transmitter in sector 12 will be detected by element 1A via side lobe 5 and by element 1B via main lobe 3. It is however imperative that the sector be established unambiguously!

Since the strength of signals received via a side lobe is substantially smaller than that of signals received via a main lobe, the insertion of a detection threshold 13, which is slightly above the side-lobe level, enables to determine whether the received r.f. signals come from azimuth sector 10 defined by the main axes or from one of the two adjacent sectors 11 and 12. Only r.f. signals from a transmitter situated in sector 10 will be received by receiving elements 1A and 1B via main lobes 2 and 3; therefore, the signals obtained from each of receiving elements 1A and 1B will be fully above the detection threshold 13.

Figure 2:
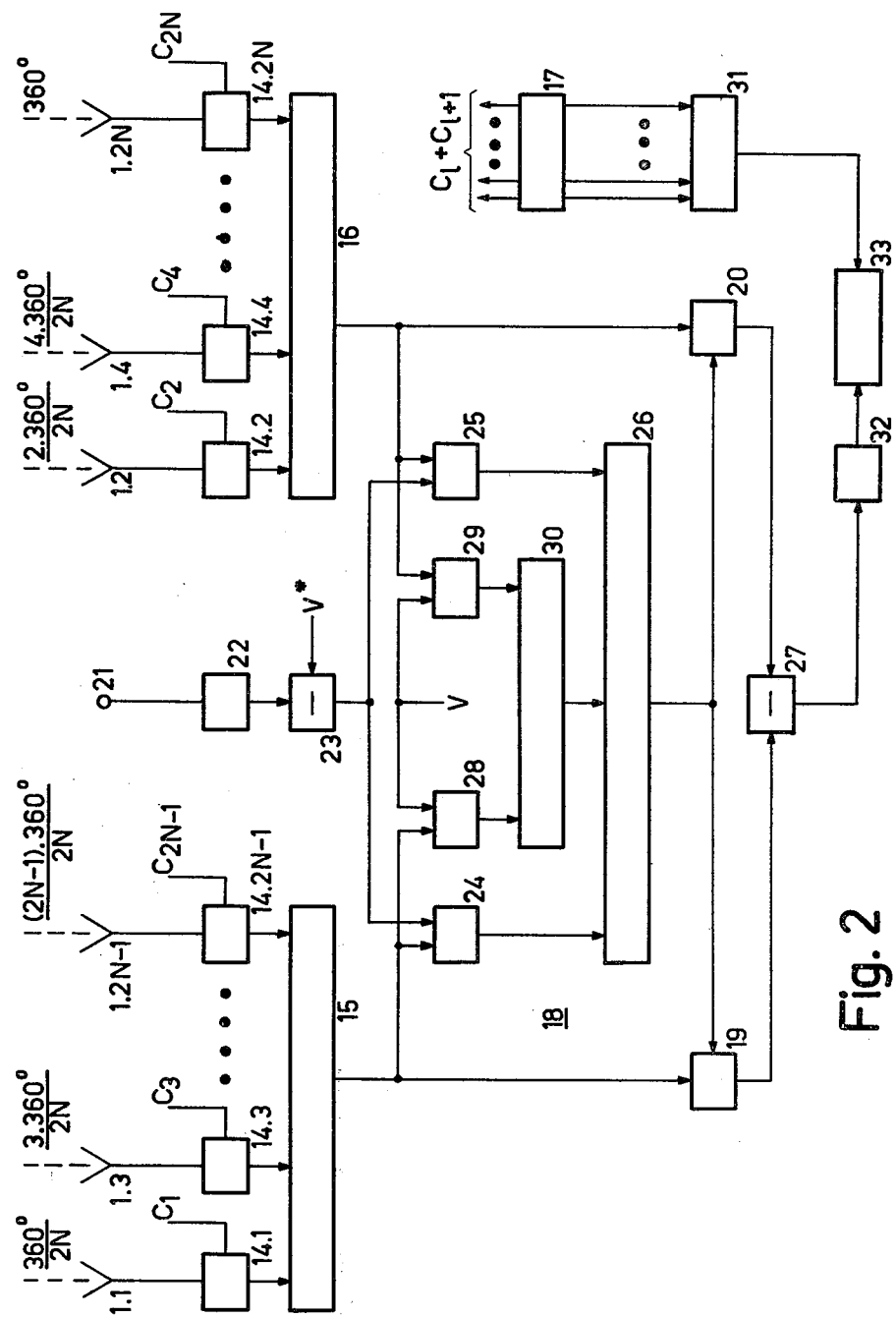
FIG. 2 is a block diagram of an embodiment of a radio direction finding apparatus in accordance with the invention.

A feasible embodiment of a radio direction finding apparatus with a sector selection based on the above concept is shown in FIG. 2. This direction finding apparatus comprises 2N horn-type receiving elements 1.1–1.2N disposed symmetrically in a circular array and in outward direction. Each receiving element 1.k, where $k=1, \ldots, 2N$, is designated $k.360°/2N$, indicating the direction in which the receiving element is oriented.

In FIG. 2 the receiving elements 1.1–1.2N are divided into two groups. One group comprises the odd-numbered receiving elements 1.1, 1.3, ..., 1(2N−1), which are connected to a first log video detector 15 via r.f. switches 14.1, ..., 14.(2N−1), such as pin diode switches. The other group includes the even-numbered receiving elements 1.2, 1.4, ..., 1.2N, which are connected to a second log video detector 16 via r.f. switches 14.2, ..., 14.2N. In each group of receiving elements, only one element is connected to the associated log video detector by the r.f. switch concerned. This should be done in such a way that two receiving elements with consecutive direction designations are connected to the respective log video detectors. The direction finding apparatus is therefore provided with a selection circuit 17 for supplying the control signals $C_l$ and $C_{l+1}$, where $l-1, \ldots, 2N-1$, to the r.f. switches 14.1 and 14.(1+1). The information required to produce these control signals may be supplied in various ways, but this falls outside the scope of the present invention.

In accordance with the invention, the two log video detectors 15 and 16 are connected to a common threshold circuit 18 and two separate gate circuits 19 and 20, which are controlled by the threshold circuit. The threshold circuit 18 is employed to determine whether the output signals of log video detectors 15 and 16 originate from r.f. signals out of the azimuth sector covered by the common part of the main lobe of the relevant receiving elements or from signals out of one of the two adjacent sectors. The output signals of each of the log video detectors 15 and 16 are therefore compared with a threshold voltage in the threshold circuit 18. If the output signals of detectors 15 and 16 exceed the threshold voltage, these signals are passed through the gate circuits 19 and 20. Since the strength of the received r.f. signal at the location of the direction finding apparatus depends on several factors, such as range and power of the transmitter, the threshold voltage should vary as the strength of the r.f. signal at the location of the transmitter. In the embodiment in question the r.f. signal of such a transmitter is therefore picked up by an omnidirectional receiving antenna 21 and is supplied to a log video detector 22. The output signal of the log video detector 22 is reduced to a required, but adjustable value V* in a reducing circuit 23. The output of the reducing circuit 23 is supplied as threshold voltage to two comparators 24 and 25. These comparators are connected to the log video detectors 15 and 16 respectively. The output signals of the log video detectors 15 and 16 are compared with the threshold voltage which varies as the r.f. signal strength at the location of the direction finding apparatus. If the output signals of detectors 15 and 16 exceed the above threshold voltage, each of the comparators 24 and 25 supplies a logically true signal to a combination circuit 26, such as a logic AND circuit, which also receives a third logically true signal yet to be discussed. If and only if these three logic signals are true, the AND circuit delivers a control signal to the two gate circuits 19 and 20, which in turn pass the output signals of the log video detectors 15 and 16 respectively, for application to a subtraction circuit 27. The output signal of subtraction circuit 27 is then a measure for the azimuth measured within the azimuth sector of the applied receiving elements.

If the design of the receiving elements is such that the amplitude difference in dB between the signals picked up by two receiving elements varies about exponentially with the azimuth angle, the output signals $\Delta I$ produced by the subtraction circuit 27 on the supply of the output signals of the log video detectors is as follows:

$$\Delta I = 10 \log A.f(\phi_o + \Delta\phi - \alpha) - 10 \log A.f(\phi_o + \Delta\phi) = k.\Delta\phi,$$

where $f(\phi)$ is the sensitivity factor in the azimuth direction $\phi$, whereby $f(\phi)$ is a maximum at $\phi_o$ and is divided symmetrically about $\phi_o$, $\Delta\phi$ the receiving direction of the signals with respect to the centre of the horn, A the amplitude of the received signals, and k a constant. The logic signal supplied to the AND circuit 26 concerns the additional condition that the direction finding apparatus may be operative only if at least in one of the connected receiving elements the strength of the received signals is sufficient, i.e. exceeds a certain threshold value. This is done to prevent the activation of the direction finding apparatus signals which are too weak. The direction finding apparatus therefore further comprises two comparators 28 and 29, supplied with the output signals of the log video detectors 15 and 16 respectively, in which comparators these output signals are compared with a fixed threshold voltage V. If the output signal of at least one of the log video detectors 15 and 16 exceeds the threshold voltage V, an OR circuit 30 connected to comparators 28 and 29 passes the aforementioned third logically true signal to the AND circuit 26. The required number of receiving elements 1.1-1.2N is closely connected with the beam width of each element. If the beam width is assumed to be $2\alpha°$, the width of a sector is $\alpha°$; hence, $360°/\alpha°$ receiving elements are required. In a preferred embodiment the receiving elements 1.1-1.2N are of the horn type and have a beam width of more than 90°; therefore, eight receiving elements are required, which elements are inclined at an angle of 45° with respect to the adjacent elements.

Furthermore, it is possible to derive a numerical value for the azimuth angle from the output signal of the subtraction circuit 27 and the information about the sector determined by selection circuit 17. In the described embodiment of a radio direction finding apparatus this numerical value is obtained by digital means, although analogue means may be employed as well. The output signal of the subtraction circuit 27 is applied to an analogue-digital converter 32, in turn producing digital information for the least significant bit positions in an adder 33, while the selection circuit 17 supplies a coder 31 with a control signal relating to the selected sector. The coder 31 in turn produces digital information for the most significant bit positions in the adder 33. In the adder the digital information of the analogue-digital converter 32 and the coder 31 is combined to form a digital value representing the complete azimuth angle.

I claim:

1. A radio direction finding apparatus comprising an omni-directional receiving antenna element, an array of directional receiving antenna elements, two log video detectors, means for separately connecting pairs of contiguous elements of said array to said two detectors, a third log video detector connected to said omni-directional element, means coupled to each of said two detectors and said third detector for producing a control signal when the output signals from each of said two detectors differs from the output signal from said third detector by a predetermined value, a subtraction circuit for generating, in response to output signals from said two detectors, a signal representative of the azimuth of a transmitter transmitting a signal received by the pair of contiguous elements connected to said two detectors, and gate means coupled to each of said two detectors and responsive to said control signal for applying the output signals from said two detectors to said generating means upon occurrence of said control signal.

2. The apparatus according to claim 1 wherein said control signal producing means includes means coupled to said third detector for reducing the output signal of said third detector, two comparators each connected to said reducing means and to a respective one of said two detectors, said comparators each producing an output signal when the output signal from the respective one of said two detectors exceeds the reduced output signal from said third detector, and a combination circuit connected to said two comparators for producing said control signal upon receipt of the output signals from both of said comparators.

3. The apparatus according to claim 2 wherein said control signal producing means includes a third and fourth comparator each connected to a respective one of said two detectors for comparing the output signals from said detectors with an adjustable threshold voltage and a logic circuit connected to said third and fourth comparators for enabling said combination circuit so that said control signal is generated when, and only when the output signal from at least one of said two detectors exceeds said threshold voltage.

* * * * *